United States Patent
Rueda et al.

(10) Patent No.: US 10,370,889 B2
(45) Date of Patent: Aug. 6, 2019

(54) VEHICLE SECURITY BOX

(71) Applicants: Lucio Oliva Rueda, Heber City, UT (US); Lucio M. Oliva Perez, Heber City, UT (US)

(72) Inventors: Lucio Oliva Rueda, Heber City, UT (US); Lucio M. Oliva Perez, Heber City, UT (US)

(*) Notice: Subject to any disclaimer, the term of this patent is extended or adjusted under 35 U.S.C. 154(b) by 55 days.

(21) Appl. No.: 15/611,149

(22) Filed: Jun. 1, 2017

(65) Prior Publication Data
US 2017/0368999 A1    Dec. 28, 2017

Related U.S. Application Data

(60) Provisional application No. 62/344,629, filed on Jun. 2, 2016.

(51) Int. Cl.
| | |
|---|---|
| *E05G 1/02* | (2006.01) |
| *E05G 1/04* | (2006.01) |
| *B60R 7/08* | (2006.01) |
| *E05G 1/00* | (2006.01) |
| *E05B 65/00* | (2006.01) |
| *E05B 63/00* | (2006.01) |

(52) U.S. Cl.
CPC ............ *E05G 1/04* (2013.01); *B60R 7/087* (2013.01); *E05B 65/0075* (2013.01); *E05G 1/005* (2013.01); *E05G 1/02* (2013.01); *E05B 63/0008* (2013.01); *E05G 2700/02* (2013.01); *E05Y 2900/50* (2013.01)

(58) Field of Classification Search
CPC .. E05G 1/00; E05G 1/005; E05G 1/02; E05G 1/024; E05G 1/026; E05G 1/04; E05G 2700/00; E05G 2700/02
See application file for complete search history.

(56) References Cited

U.S. PATENT DOCUMENTS

| | | | |
|---|---|---|---|
| 4,926,762 A | 5/1990 | Paul | |
| 5,971,515 A * | 10/1999 | Baker | E05D 5/065 312/329 |
| 7,350,470 B1 * | 4/2008 | Stuhlbarg | E05D 7/14 109/73 |
| 7,404,363 B2 * | 7/2008 | Dunstan | E05D 3/12 109/70 |
| 7,793,600 B2 * | 9/2010 | Dunstan | E05D 3/12 109/70 |
| 9,278,649 B2 | 3/2016 | McGoldrick et al. | |
| 9,423,211 B2 * | 8/2016 | Ho | F41C 33/06 |
| 9,732,549 B2 * | 8/2017 | Chow | E05D 7/14 |

(Continued)

*Primary Examiner* — Christopher J Boswell
(74) *Attorney, Agent, or Firm* — Bretton L. Crockett; TechLaw Ventures, PLLC

(57) ABSTRACT

Lockbox systems for securing items in a vehicle. In one embodiment, a hollow rectangular body has an open side which may be closed by a door. One or more L shaped locking members are disposed on the rear of the door adjacent a first longitudinal side. As the door is closed, the members are positioned to reside in locking recesses in a wall of the body, abuttably locking the door at the hinged side. Near a second side of the door, a locking mechanism is disposed that can be actuated to move a locking bolt into a bolt recess to secure the door in the body opening. The rear side surfaces of the door may be beveled to pair against a ridge disposed inside the opening to deter attempts to pry the door open.

20 Claims, 5 Drawing Sheets

(56) References Cited

U.S. PATENT DOCUMENTS

| | | | |
|---|---|---|---|
| 9,777,510 B2 * | 10/2017 | Moller | E05B 39/00 |
| 10,060,177 B2 * | 8/2018 | Smith | F41C 33/06 |
| 2013/0055933 A1 * | 3/2013 | Markman | E05G 1/005 |
| | | | 109/50 |
| 2013/0229098 A1 * | 9/2013 | Pletcher | E05G 1/04 |
| | | | 312/237 |

* cited by examiner

VEHICLE SECURITY BOX

CROSS-REFERENCE TO RELATED APPLICATION

This application claims the benefit of U.S. Provisional Application No. 62/344,629, filed Jun. 2, 2016, the disclosure of which is incorporated herein by reference in its entirety.

TECHNICAL FIELD

The present disclosure relates to secure storage containers for use in vehicles.

BACKGROUND

As smartphones, tablets, and other portable electronics have become ubiquitous, users carry them almost everywhere. Because of the value of these items, there is a need to securely store them temporarily. This is often done by simply locking them in a vehicle. Unfortunately, cars are regularly vandalized or broken into, which can make this a less than optimal solution, and even encourages such behavior. While lockboxes and safes for vehicles are known, these have typically been elaborate safes that are difficult to open for protecting highly valuable items, or "quick access" boxes for securing guns. Such designs can be prohibitively expensive when sufficiently secure, or far more elaborate then needed by an average user for an electronic device.

A simple to use and install lockbox that provided a higher level of security would be an improvement in the art.

SUMMARY

The present disclosure is directed to a lockbox system for securing items in a vehicle. In one embodiment, a hollow rectangular body has an open side which may be closed by a door. One or more L shaped locking members are disposed on the rear of the door adjacent a first side. As the door is closed, the members are positioned to reside in locking recesses in a wall of the body, abuttably locking the door at the first side. Near an opposite second side of the door, a locking mechanism is disposed that can be actuated to move a locking bolt into a bolt recess to secure the door in the body opening. The rear side surfaces of the door may be beveled to pair against a ridge disposed inside the opening to deter attempts to pry the door open. The body may be formed of plate steel and the bottom may have features for attachment to a vehicle surface, such as the floor of a trunk.

DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

The present invention relates to apparatus, systems and methods related to containers for secure storage of items in vehicles. It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure. It will be appreciated that the examples and details given therein are illustrative of a particular embodiment are not limiting of the present disclosure.

Figure 5A:
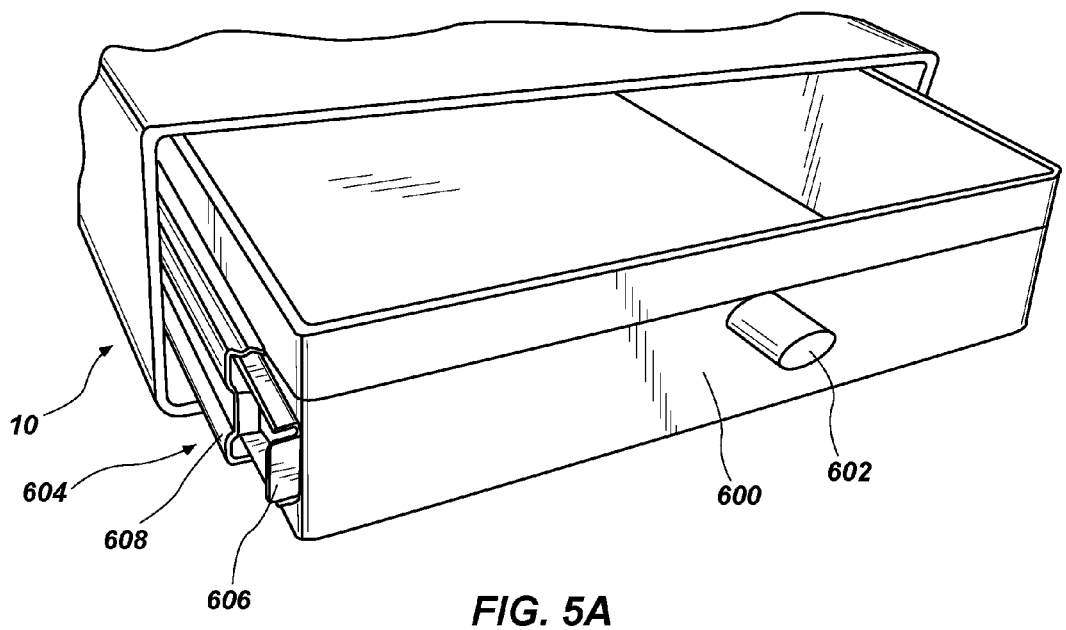
FIGS. 5A and 5B are a perspective view of a drawer assembly for use with a system in accordance with the present disclosure in installed and uninstalled positions.
Figure 5B:
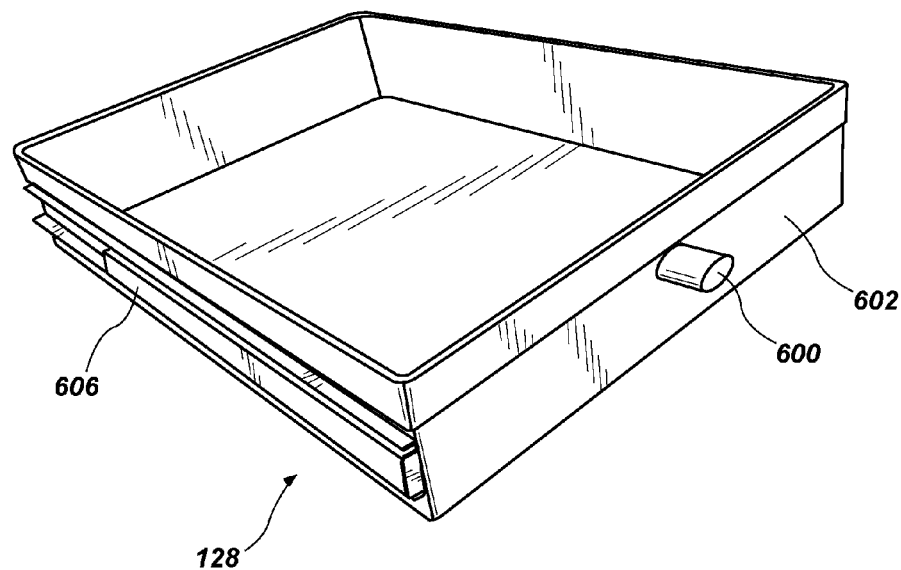

Turning to FIGS. 1, 2A, 2B and 3, a first system 10, in accordance with the present disclosure is depicted. A hollow rectangular body 100 has a top side 120, bottom side 122, two opposite longitudinal sides 124 and 126, and a closed rear side 128 (FIG. 5B). A front side of the body 100 may be an opening 102 defined by the top, bottom and longitudinal sides 120, 122, 124 and 126 and providing access to the interior.

Figure 1:
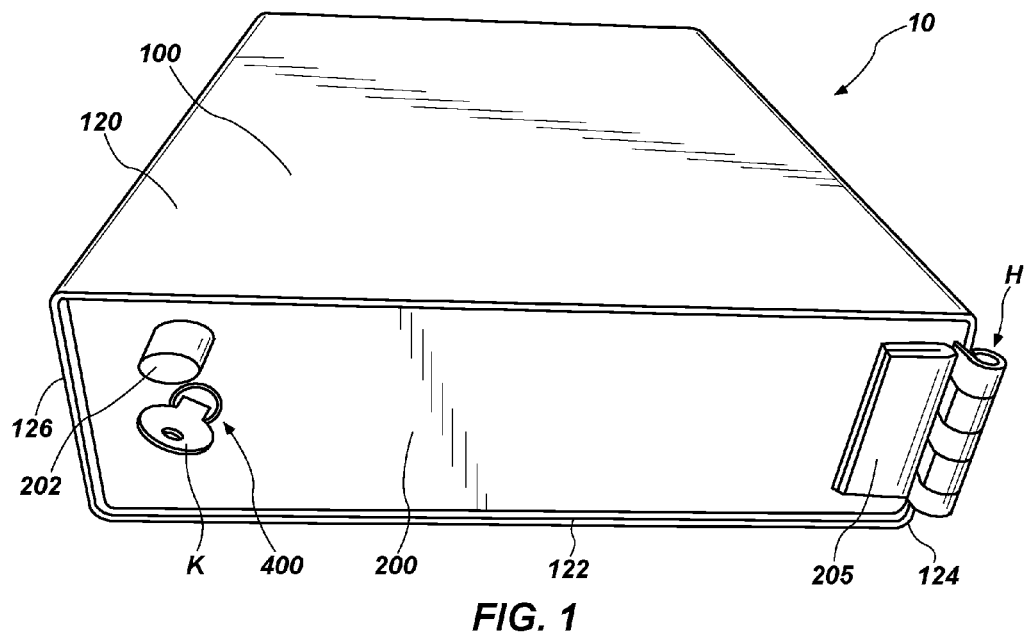
FIG. 1 is a front perspective view of a first illustrative system in accordance with the present disclosure.
Figure 2A:
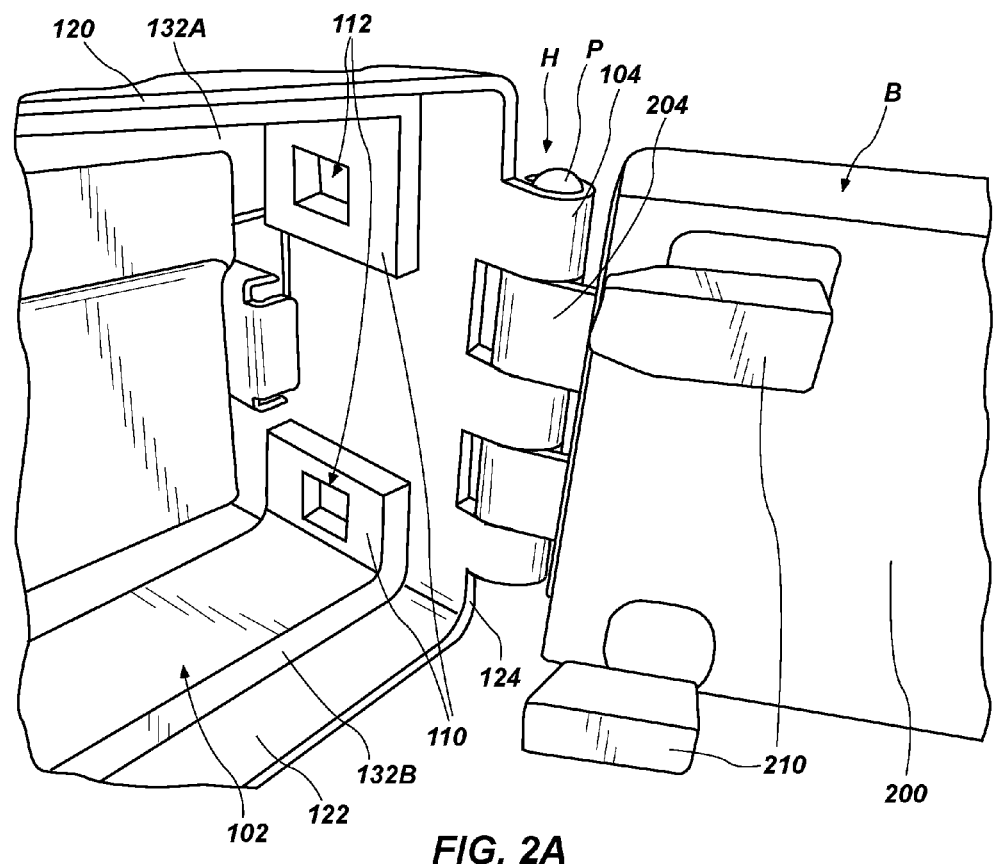
FIGS. 2A and 2B are partial rear views of the door of the embodiment of FIG. 1.
Figure 2B:
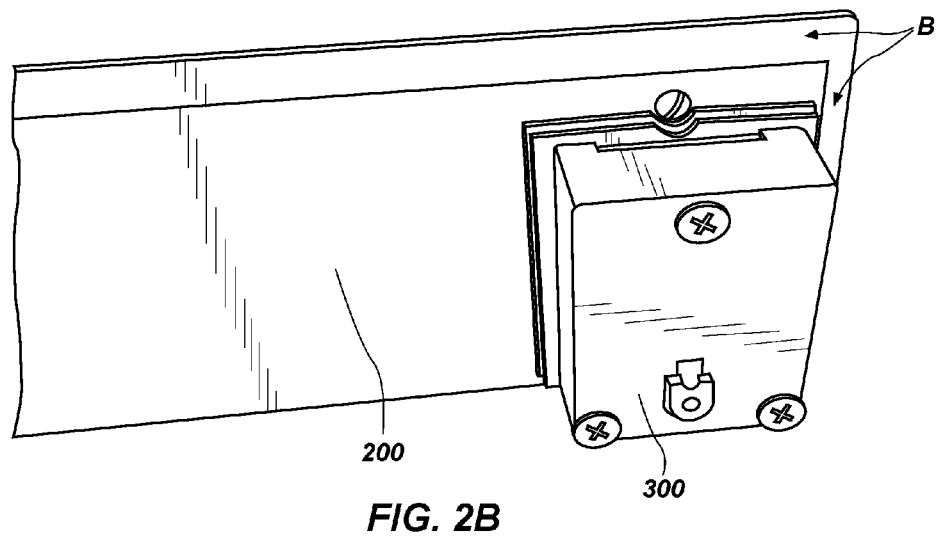
Figure 3:
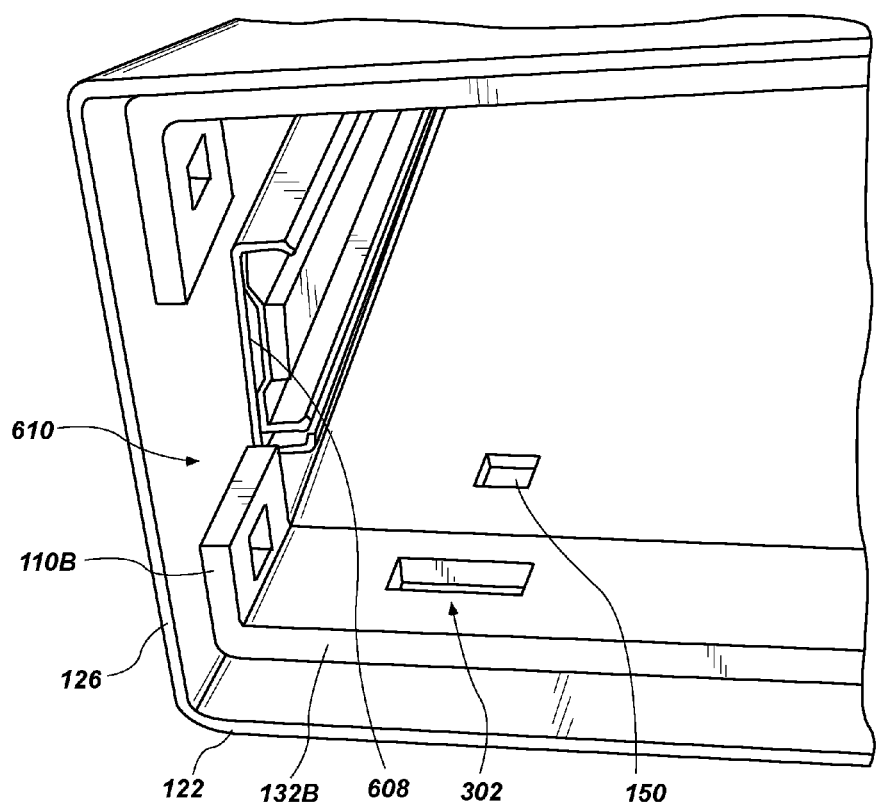
FIG. 3 is a partial front view into the opening of the system of FIGS. 1-2B.

In the depicted embodiment of FIGS. 1, 2A, and 2B, a hinge assembly H may be disposed near the opening 102 at a first longitudinal side 124. A door 200 formed as a generally planar member for closing the opening 102 may be attached to the hinge assembly H at a first hinged side. As best depicted in FIG. 1, upon closing, the door 200 fits inside the opening 102.

The hinge assembly H may be formed of a number of circular flanges 104 and 204 attached to the longitudinal side 124 and the door 200 respectively, which are aligned around a pin P. As depicted, the flanges 104 may be continuous with the longitudinal side 124, but it will be appreciated that any suitable hinge assembly may be used. The door side flanges 204 may be attached to a plate 205 disposed on the door front or be directly continuous with the door body.

Disposed inside the opening 102 are ridges, including top ridge 132A and bottom ridge 132B, which may be continuous protrusions running extending along the width of the top and bottom sides and defining a "stop" behind door 200 when in a closed position. As depicted, additional side ridges 110A and 110B may be present in the interior on the longitudinal sides 124 and 126, as will be discussed further below and may be continuous with the top and bottom ridges.

One or more L shaped locking members 210 are disposed on the rear of the door adjacent the first hinged side. In the depicted embodiment, two locking member 210 are depicted, although it will be appreciated in other embodiments differing numbers may be used. It is presently preferred that at least two are present. The members 210 may extend into the material of the door for further security.

As the door is closed, the members are positioned by the rotation of the hinge H so that the distal ends reside in locking recesses 112 which may be disposed in the side ridges 110 on the longitudinal side 124 wall of the body and closely correspond to the distal ends of the locking members. This serves to abuttably lock the door 200 to the body 100 at the hinged side. Each locking recess 112 may be formed as an notch or recess in a side ridge 110 into which the distal end of a locking member 210 can be inserted, with sidewalls of the recess abutting the sides of the locking member so the door cannot be removed except by reversing the rotation.

Figure 2C:
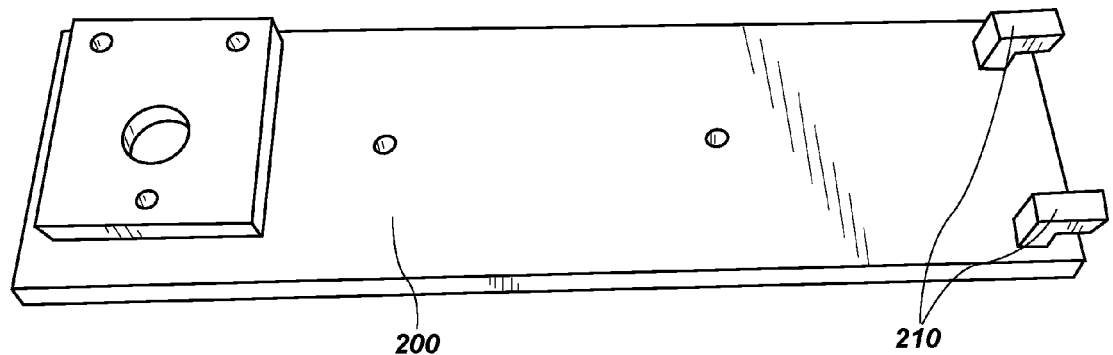
FIG. 2C is a rear view of the door of a second illustrative embodiment in accordance with the present disclosure.
Figure 2D:
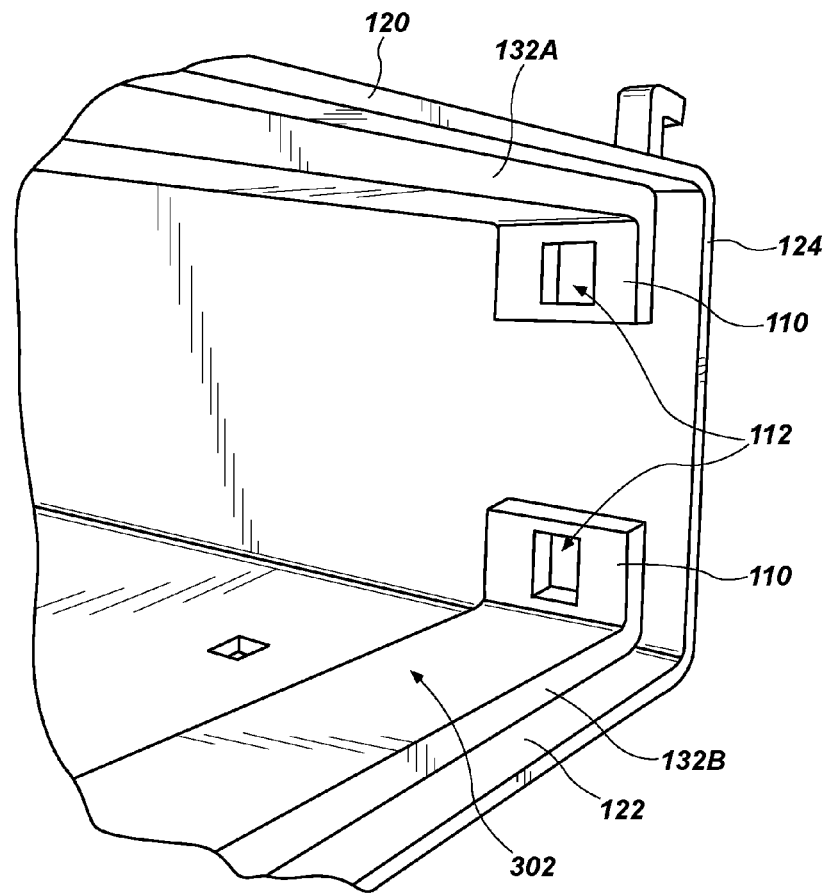
FIG. 2D is a partial front view into the opening of the system of FIG. 2C.
Figure 4:
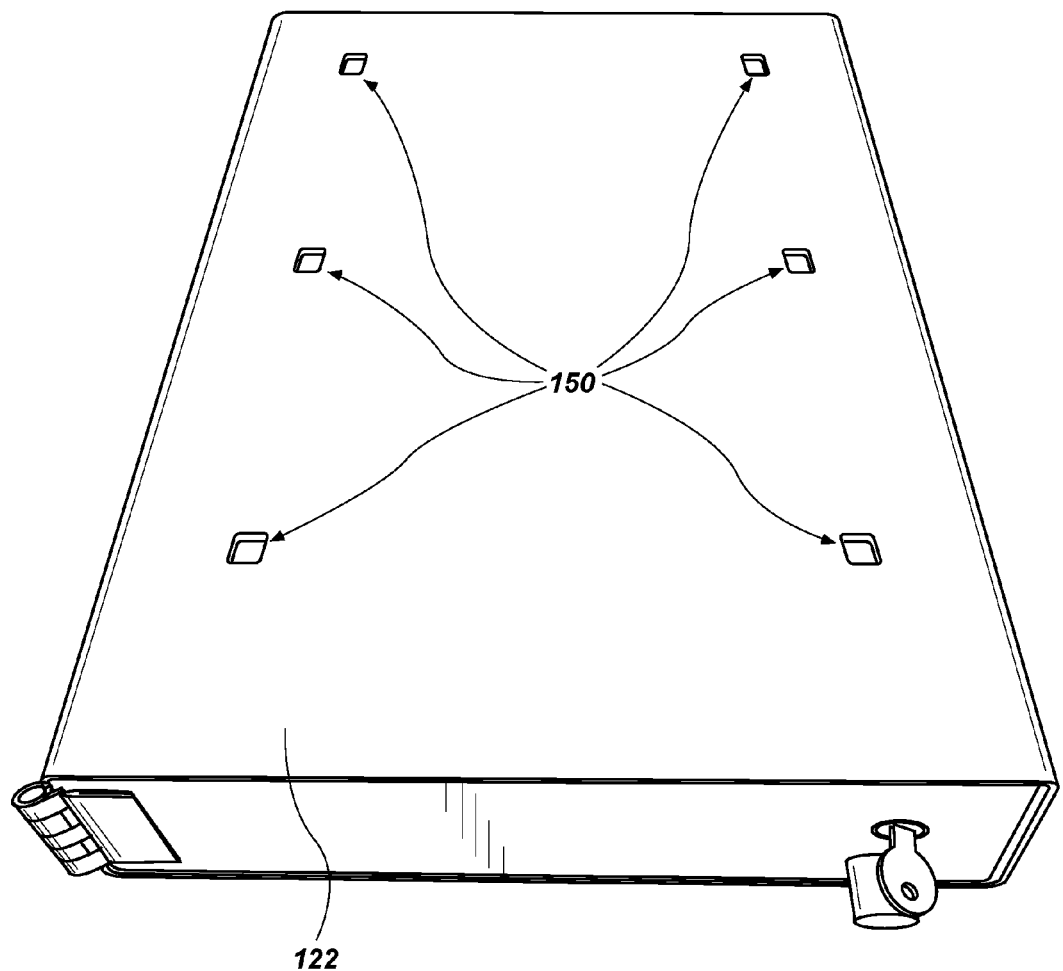
FIG. 4 is a perspective view of the bottom of the system of FIGS. 1-2B and 3.

As depicted in FIGS. 2C and 2D, in a second illustrative embodiment, a second system 10A may lack a hinge assembly H, but otherwise share similar structures with the locking members 210A rotating into the locking recesses 112 A to abuttably lock the door 200A at the first longitudinal side. In such embodiments, the locking members 210A may serve as a hinge and the ability to completely remove the door may allow for use and installation in areas where the fixed rotation of the hinge H could limit the system from use, such as under a car seat.

A common method tried to open locked boxes and safes is to break the hinge and pry the door open from the hinged side. Should there be an attempt to access the system, 10 in this manner, the abutting interference of the locking members with the recesses acts as a lock to prevent the door 200 from being pried away from the opening 102.

Near a second side of the door, a locking mechanism 300 is disposed that can be actuated to move a locking bolt into a bolt recess 302 to secure the door 200 in the opening 102. As depicted, the bolt recess 302 may be located in the bottom ridge 132B lower ridge. In other embodiments with other locking mechanisms, bolt recesses may be disposed above or below the mechanism, or on the interior of the longitudinal side 126 (as in a recess in a side ridge 110B) or in any combination thereof. In the depicted embodiment, the lock mechanism is actuated by a key K which is placed in a keyhole and turned to extend or retract the bolt, as known in the art. The keyhole is accessible on the front of door 200 by a tumbler opening 400 into which the tumbler snugly fits. A handle 202 may also be attached to the front of door 200 to facilitate opening and closing.

It will be appreciated that in other embodiment, the locking mechanism may be disposed on the body of the system with the bolt recess or other suitable latch receiver disposed on the door, as on a structure formed thereon.

The rear side surfaces of the door, especially along the top, bottom and lock side may be beveled from a wider central portion to a thinner edge, as indicated at B in FIGS. 2A and 2B. In the depicted embodiment, this bevel may be at an angle of about 30 degrees. It will be appreciate that this angle may vary based on the particular embodiment, but an angle of from about 25 to about 35 degrees is presently preferred. This further recesses the closed door 200 in the opening 102 and makes for a smaller accessible edge to deter attempts to pry the door 200 open. In some embodiment, the front side of the ridges may be slanted to match the bevel as well.

The bottom side 122 of the body may include attachment features to allow the system 10 to be mounted in a vehicle. In the depicted embodiment, a number of attachment holes 150 pass through the bottom side and allow for bolts or screws, such as carriage bolts, to be placed therethrough to attach the system to a vehicle surface. For example, the system could be attached to the floor of an automobile trunk, or to the floor under the seat of a pickup.

With the depicted embodiments, a sliding drawer assembly may be disposed in the interior to facilitate use. A drawer 600 may be formed as an open top box and may have a handle 602 for pulling it out of, and pushing it into, the recess of the system 10. Drawer slides 604, which include a drawer member 606 and a system member 608 that interact with one another to allow the drawer 600 to easily slide into and out of the system for use are depicted. In the depicted embodiment, two drawer slides 602 are depicted, one on either side of the drawer 600, with system members 608 attached to the interior surfaces of the longitudinal sides. A drawer "break" 610 (FIG. 3) is disposed in the side ridges 110 to allow slides 602 to function by passing therethrough. It will be appreciated that in other embodiments, a bottom mounted drawer slide may be used. Drawer 602 may be padded for protecting inserted electronics, or may hold a form for retaining a particular electronic component.

The body may be formed of plate steel or other suitably strong material. The strength of the body allows the system to protect delicate electronics placed inside while supporting heavier items that are placed in a trunk. The use of plate steel and the box formed body provide a great deal of strength, making a solid and secure system for protecting valuables. For installation, the outer surface of the body, especially the upper surface may be covered with a textile material for padding or to make it less noticeable in the vehicle (as by matching the trunk liner).

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains and which fall within the limits of the appended claims.

What is claimed is:

1. A lockbox system for securing items, comprising:
   a hollow rectangular body with at least one opening on a first side;
   a lower ridge disposed inside the at least one opening and along at least a portion of a lower inside surface of the rectangular body generally extending in a first direction to define a lower seat inside the at least one opening;
   an upper ridge disposed inside the at least one opening and along at least a portion of an upper inside surface of the rectangular body generally extending in the first direction to define an upper seat inside the at least one opening;
   at least a first locking recess disposed inside the at least one opening along a first side inside surface of the rectangular body, the first inside surface extending generally in a second direction which is generally perpendicular to the first direction;
   at least a first latch receiver;
   a generally planar door member sized and configured such that when disposed in the at least one opening a lower side of the door member resides in the lower seat and an upper side of the door member resides in the upper seat with a rear surface of the door member abutting the lower ridge and the upper ridge;
   at least a first L-shaped locking member disposed on the rear surface of the door member adjacent a first longitudinal side, the at least first L-shaped locking member having a locking portion extending towards the first longitudinal side to a distal end such that when the door member is rotated to dispose the door in a closed position the distal end is positioned in the at least a first locking recess to abuttably secure the door member to the rectangular body at the first side surface.

2. The system of claim 1, further comprising a second locking recess disposed inside the at least one opening along a first side inside surface of the rectangular body vertically disposed from the at least first locking recess.

3. The system of claim 2, further comprising a second L-shaped locking member disposed on the rear surface of the door member adjacent a first longitudinal side, such that when the door member is rotated to dispose the door in a closed position a distal end of the second locking member is positioned in the second locking recess to abuttably secure the door member to the rectangular body at the first side surface.

4. The system of claim 1, wherein the at least a first locking recess is disposed on a first side ridge disposed inside the at least one opening and along a portion of the first side inside surface of the rectangular body.

5. The system of claim 1, further comprising a lock assembly disposed on the door member, the locking assembly comprising a first bolt that may be extended to secure in the at least first latch receiver when the door member is disposed in the at least one opening to abuttably secure the door member to the rectangular body.

6. The system of claim 5, wherein the at least a first latch receiver comprises at least a first recess disposed inside the at least one opening along a second side inside surface of the rectangular body.

7. The system of claim 5, wherein the at least a first latch receiver comprises an upper recess disposed in the upper ridge.

8. The system of claim 7, further comprising a second latch receiver formed as a lower recess disposed in the lower ridge.

9. The system of claim 8, wherein the locking assembly further comprises a second bolt that may be extended to secure in the second latch receiver.

10. The system of claim 9 wherein the lock assembly further comprise a tumbler assembly for use with a key.

11. The system of claim 10, wherein the door member has a tumbler opening on a front surface thereof through which a key may be inserted into the tumbler assembly.

12. The system of claim 1, wherein the upper and lower side surfaces of the door member are angled from the rear surface of the door member to a narrower edge.

13. The system of claim 12, wherein the upper and lower side surfaces of the door member are angled from the rear surface of the door member to a narrower edge at an angle of from about 25 degrees to about 30 degrees.

14. The system of claim 1, wherein the door member is rotatably attached to the rectangular body by a hinge assembly.

15. The system of claim 1, further comprising a drawer assembly comprising at least a first drawer slide attached to an inside surface of the rectangular body and a drawer box attached to the at least a first drawer slide, such that the drawer box may be slidably extended from the interior of the rectangular body through the opening for access.

16. A lockbox system, comprising:
   a hollow rectangular body with at least one opening on a first side;
   a lower ridge disposed inside the at least one opening and along at least a portion of a lower inside surface of the rectangular body generally in first direction to define a lower seat inside the at least one opening;
   an upper ridge disposed inside the at least one opening and along at least a portion of an upper inside surface of the rectangular body generally in the first direction to define an upper seat inside the at least one opening;
   at least two locking recesses disposed inside the at least one opening along a first side inside surface of the rectangular body, the first inside surface extending generally in a second direction which is generally perpendicular to the first direction;
   at least a first locking mechanism;
   a generally planar door member sized and configured such that when disposed in the at least one opening a lower side of the door member resides in the lower seat and an upper side of the door member resides in the upper seat with a rear surface of the door member abutting the lower ridge and the upper ridge;
   at least two L-shaped locking members disposed on the rear surface of the door member adjacent a first longitudinal side which are parallel to one another, each L-shaped locking member having a locking portion extending towards the first longitudinal side to a distal end, such that when the door member is rotated to dispose the door in a closed position ft the distal end of each of the least two locking members is positioned one of the least two locking recesses to abuttably secure the door member to the rectangular body at the first side surface.

17. The system of claim 16, wherein the at least two locking recesses are disposed on side ridges disposed inside the at least one opening and along a portion of the first side inside surface of the rectangular body.

18. The system of claim 16, wherein the at least a first locking mechanism comprise a tumbler assembly and at least a first bolt that may be extended by actuation of the tumbler assembly to reside in a latch receiver when the door member is disposed in the at least one opening to abuttably secure the door member to the rectangular body.

19. The system of claim 16, wherein the upper and lower side surfaces of the door member are angled from the rear surface of the door member to a narrower edge.

20. The system of claim 16, wherein the door member is rotatably attached to the rectangular body by a hinge assembly.

* * * * *